UNITED STATES PATENT OFFICE.

JOHN L. NEWELL, OF PORT HURON, MICHIGAN.

IMPROVEMENT IN COMPOUNDS FOR MIXING PAINTS.

Specification forming part of Letters Patent No. 141,231, dated July 29, 1873; application filed June 3, 1873.

*To all whom it may concern:*

Be it known that I, JOHN L. NEWELL, of Port Huron, in the county of St. Clair and State of Michigan, have invented a new and useful Improvement in Compound for Mixing Paints; and I do declare that the following is a true and accurate description thereof.

The nature of my invention relates to a new article of manufacture to be employed with oils, turpentine, or any of the ordinary ingredients used in mixing paints, imparting to the paint a greater body, a finer gloss and elasticity, and greater durability than when mixed without my compound. Its properties are best displayed when used in equal proportion of linseed-oil, but may be used in any proportion with linseed-oil, turpentine, or any of the articles usually employed in mixing, and the expense of painting is very materially reduced.

The composition is made in the following manner: I take a given amount of starch or farina mixed with cold soft water to the consistence of thick cream, when I add about four ounces of bicarbonate of soda, and thoroughly mix. I then add boiling water until the mass thickens, and then boil the mass until it becomes jellied, when I spread it to dry in cakes, the cakes when dry being semi-transparent and hard.

When required for use dissolve these cakes in water until the mass becomes of the consistency of boiled oil, when it is ready for mixing with the paint in any proportion desired.

When wanted for immediate use I wet up any quantity of starch with cold soft water to the consistency of thick cream, and then pour boiling water upon it until it acquires the consistency of boiled oil. I then add about two ounces of bicarbonate of soda to each gallon of the liquid, and when cold the compound is fit for use.

The object of making it into cakes, as described, is for economy in shipping.

In lieu of bicarbonate of soda, any equivalent alkali may be employed.

What I claim as my invention, and desire to secure by Letters Patent, is—

1. The compound herein described, made of the ingredients substantially in the proportions and for the purposes herein described.

2. The described compound, consisting of one pound starch, four ounces bicarbonate of soda, ground and thoroughly mixed for shipment, as set forth.

JOHN L. NEWELL.

Witnesses:
　THOS. S. SPRAGUE,
　H. S. SPRAGUE.